June 24, 1930.  W. N. BOOTH  1,766,216
BRAKE DRUM
Filed April 12, 1926
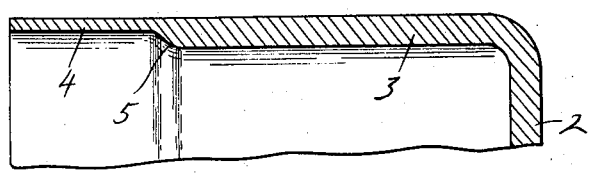
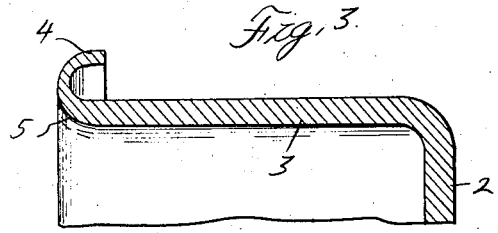
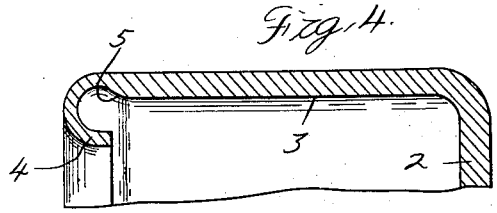
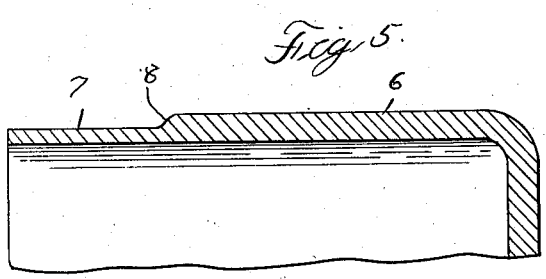
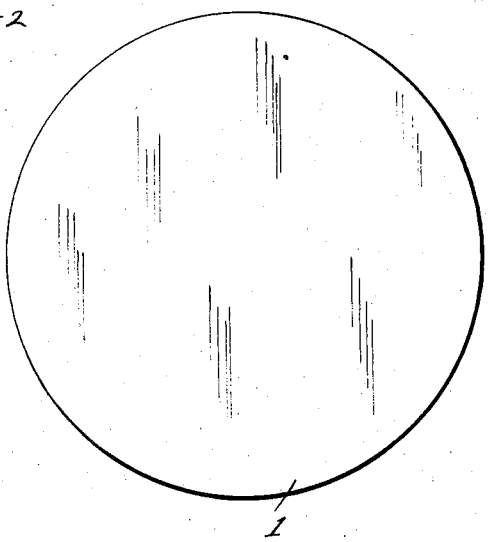
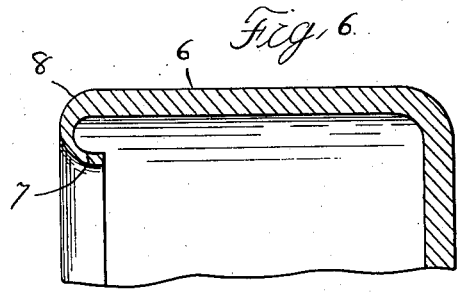
Inventor
William N. Booth
By
Attorneys Patented June 24, 1930

1,766,216

UNITED STATES PATENT OFFICE

WILLIAM N. BOOTH, OF DETROIT, MICHIGAN, ASSIGNOR TO KELSEY-HAYES WHEEL CORPORATION, OF DETROIT, MICHIGAN, A CORPORATION OF NEW YORK

BRAKE DRUM

Application filed April 12, 1926. Serial No. 101,485.

The invention relates to brake drums and is particularly applicable to brake drums having a high percentage of carbon. One of the objects of the invention is to provide a brake drum which may be formed of comparatively light gage sheet steel and which is provided with a rib upon the brake flange for reinforcing and maintaining the same circular and concentric with the axis of the brake drum. Another object is to so construct the brake drum that the reinforcing rib upon the brake flange may be practically formed without distorting or weakening the brake flange.

With these as well as other objects in view the invention resides in the novel features of construction and combinations and arrangements of parts as more fully hereinafter set forth.

In the drawings:—

Figure 1 is a plan view of a sheet metal blank from which the brake drum is formed;

Figure 2 is a similar view showing the brake drum after the next operation;

Figures 3 and 4 are similar views showing modified finished brake drums;

Figure 5 is a view similar to Figure 2 showing a modified step;

Figure 6 is a view similar to either of Figures 3 and 4 showing a finished brake drum formed from the brake drum shown in Figure 5;

The present tendency of brake drum users, such as automobile manufacturers, is to specify brake drums having a high percentage of carbon. My invention is particularly applicable to brake drums of this nature and furthermore my construction of brake drum is such that the brake flange is circular and concentric with the axis of the brake drum and may be made of relatively light gage sheet steel.

1 is a circular sheet steel blank of uniform thickness and having a high percentage of carbon from which the brake drum is formed. This blank is drawn by suitable means such as a punch and die to form the drum with the web 2 and the circular brake flange 3 concentric with the axis of the drum. The terminal flange 4 at the outer edge of the brake flange 3 is also preferably formed at the same time by means of the punch and die, this flange having a thickness less than that of the brake flange which is produced by ironing the material forming the terminal flange. As shown in Figure 2, the outer surfaces of the terminal and brake flanges are in registration and the inner surfaces are radially offset and connected by the shoulder 5. The outer edge of the terminal flange is then preferably faced, after which this terminal flange is curled by means of a suitable punch and die which hold the brake flange circular and concentric with its axis.

As shown in Figure 3, the terminal flange is curled outwardly to an extent such that its inner surface and the inner surface of the brake flange register substantially with the shoulder 6 to form a continuous surface. This curled terminal flange constitutes a bead or rib upon and integral with the brake flange to reinforce the same and maintain the same circular and concentric with the axis of the brake drum.

As shown in Figure 4, the terminal flange is curled inwardly to form a bead or rib upon and integral with the brake flange for reinforcing the same and holding the same circular and concentric with the axis of the brake drum.

Instead of forming the brake drum from the sheet steel blank 1 so that the outer surfaces of the terminal flange and brake flange register, I may form the brake drum so that the inner surfaces of the brake flange 6 and terminal flange 7 register and the outer surfaces thereof are radially offset and connected by the shoulder 8, as shown in Figure 5. After the brake drum has been formed in this manner, the terminal flange 7 may then be curled to form the reinfrocing bead or rib. Figure 6 shows the completed brake drum formed from the brake drum shown in Figure 5 by curling the terminal flange inwardly so that the outer surface of this terminal flange and the outer surface of the brake flange register substantially with the shoulder 8 to form a substantially continuous surface.

By reason of curling the terminal flange of the brake drum to extend on the side of the brake flange having its surface registering with a surface of the terminal flange, a stronger construction of finished brake drum is secured and at the same time the curling is apparently effected more easily. Also by forming a brake drum as shown in Figures 5 and 6, any machining of the brake flange or the shoulder at the end of the brake flange does not reduce the thickness of the terminal flange so that the strength of the latter is not reduced.

From the above description, it will be readily seen that I have provided an improved brake drum which may be formed from a sheet steel blank having a high percentage of carbon and which is so constructed that the gage of the sheet steel may be less than heretofore used and at the same time the brake flange is maintained circular and concentric with the axis of the brake drum.

What I claim as my invention is:

1. A brake drum having a brake flange portion and a curled terminal flange portion forming a substantially semi-circular reinforcing rib for maintaining said brake flange portion circular.

2. A brake drum having a brake flange portion and a return-bent ironed terminal flange portion of less thickness than said brake flange portion forming a reinforcing rib for maintaining said brake flange portion circular.

3. A brake drum having a brake flange portion and a transversely extending substantially semi-circular terminal flange portion of less thickness than said brake flange portion with a surface registering with a surface of said brake flange portion, said terminal flange portion extending on the side of said brake flange portion having a surface registering with a surface of said terminal flange portion.

4. A brake drum having a brake flange portion and a transversely extending return-bent terminal flange portion of less thickness than said brake flange portion with a surface registering with a surface of said brake flange portion and the opposite surface offset from the opposite surface of said brake flange portion and a shoulder connecting said last-mentioned surface, said terminal flange portion extending on the side of said brake flange portion having a surface registering with a surface of said terminal flange portion and arranged to substantially register the offset surfaces of said brake flange portion and terminal flange portion with said shoulder.

5. A brake drum having a brake flange portion and a transversely extending return-bent terminal flange portion of less thickness than said brake flange portion with an inner surface registering with the inner surface of said brake flange portion, said terminal flange portion extending inwardly from said brake flange portion.

6. A brake drum having a brake flange portion and a return-bent terminal flange portion forming a rounded reinforcing rib, for maintaining said brake flange portion circular.

7. A brake drum having a brake flange portion and a terminal flange portion offset radially from one surface of said brake flange and return-bent in cross section to form an annular reinforcing rib.

8. A brake drum for vehicles, including a web having a substantial cylindrical rearwardly extending peripheral braking flange, the flange margin rebent forwardly in overlapping relation to the extent of but a minor fraction of the width of the braking flange, whereby to stiffen the flange while leaving its braking portion externally exposed for cooling.

In testimony whereof I affix my signature.

WILLIAM N. BOOTH.